United States Patent [19]

Hayami

[11] Patent Number: 5,236,985
[45] Date of Patent: Aug. 17, 1993

[54] FLAME-RETARDANT RESIN COMPOSITION AND INSULATED ELECTRICAL WIRE EMPLOYING THE SAME

[75] Inventor: Hiroshi Hayami, Osaka, Japan

[73] Assignee: Sumitomo Electric Industries Ltd., Osaka, Japan

[21] Appl. No.: 756,019

[22] Filed: Sep. 6, 1991

[30] Foreign Application Priority Data

Sep. 7, 1990 [JP] Japan .................................. 2-235900
Apr. 19, 1991 [JP] Japan .................................. 3-113832

[51] Int. Cl.$^5$ .......................... C08J 3/28; C08K 5/24; C08L 23/04
[52] U.S. Cl. ..................................... 524/265; 524/436
[58] Field of Search ................ 524/265, 436

[56] References Cited

U.S. PATENT DOCUMENTS 5,059,651 10/1991 Ueno .................................. 524/436
5,063,266 11/1991 McRae .................................. 524/269

Primary Examiner—Paul R. Michl
Assistant Examiner—U. K. Rajguru
Attorney, Agent, or Firm—Sughrue, Mion, Zinn, Macpeak & Seas

[57] ABSTRACT

A flame-retardant resin composition obtained by irradiating with ionizing radiation a resin composition comprising 100 parts by weight of a thermoplastic resin, from 100 to 250 parts by weight of magnesium hydroxide, and from 1 to 10 parts by weight of an organosilicon compound represented by formula (I):

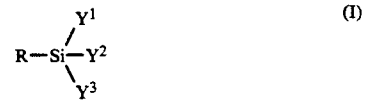

wherein R represents an alkyl group containing a methacrylic or acrylic group and $Y^1$, $Y^2$, and $Y^3$ each represents a group selected from the group consisting of an alkyl group, an alkoxyl group, and a halogen group; and an insulated electrical wire obtained by coating the above flame-retardant resin composition on a conductor followed by irradiation.

16 Claims, No Drawings

FLAME-RETARDANT RESIN COMPOSITION AND INSULATED ELECTRICAL WIRE EMPLOYING THE SAME

FIELD OF THE INVENTION

The present invention relates to a flame-retardant resin composition that not only is free from evolution of harmful gases and has excellent flame retardant properties, but also has excellent initial tensile strength, heat aging resistance, and electrical characteristics, The present invention also relates to an insulated electrical wire employing the flame-retardant resin composition.

BACKGROUND OF THE INVENTION

Electrical wires for use in industrial machines such as computers, office-use equipments, and vehicles and in home-use electronic machines such as audio equipments, video recorders and players, and personal computers and electrical wires for house wiring and other uses are recently required to have good flame-retardant properties along with the property of not evolving harmful gases during combustion. Along these requirements, insulating tubings for the protection or terminal treatment of those electrical wires are also coming to be required to have good flame retardant properties along with the property of not evolving harmful gases during combustion.

A known expedient for attaining the required flame retardancy is to incorporate a large amount of magnesium hydroxide, which is a flame retardant not containing a halogen, into a thermoplastic resin such as a polyolefin (JP-B-62-181, JP-B-57-10898). (The term "JP-B" as used herein means an "examined Japanese patent publication".)

However, flame-retarded resin compositions obtained by incorporating a large amount of magnesium hydroxide into thermoplastic resins such as polyolefins have been unsuited for use in applications such as insulated electrical wires and insulating tubings, because they have a problem of low volume resistivity and also have a problem in that their initial tensile strengths are low and their properties are impaired significantly through heat aging.

For example, the volume resistivity of polyolefin-based heat-shrinkable tubings should be $10^{-14}\Omega$cm or more according to the UL (Underwriters Laboratories) Standards. In the case of polyolefin resin-insulated electrical wires, the UL Standards prescribe that the initial tensile strength be 1.06 kg/mm² or more and the residual elongation at break after heat aging (percent retention of elongation at break after heat aging) be 65% or more. However, such a flame-retardant material containing no halogen is not known that satisfies heat aging characteristics requirements such as the UL rating of 105° C. (residual initial tensile strength at break after 7-day heat aging at 136° C. of 70% or more and residual elongation at break after the same heat aging of 65% or more) and the UL rating of 125° C. (residual initial tensile strength at break after 7-day heat aging at 158° C. of 70% or more and residual elongation at break after the same heat aging of 65% or more) as well as the above-described volume resistivity and initial tensile strength requirements.

Of the above-described problems, only the volume resistivity problem has been eliminated by use of a resin composition obtained by incorporating from 100 to 250 parts by weight of magnesium hydroxide and from 5 to 50 parts by weight of clay into 100 parts by weight of a thermoplastic resin such as an ethylene-vinylacetate copolymer or an ethylene-ethylacrylate copolymer thereby to improve volume resistivity without impairing the flame retardancy of the resin, as disclosed in JP-A-63-260957. (The term "JP-A" as used herein means an "unexamined published Japanese patent application".)

SUMMARY OF THE INVENTION

An object of the present invention is to provide a flame-retardant resin composition having excellent mechanical properties including initial tensile strength and excellent heat aging resistance and flame retardancy.

Another object of the present invention is to provide a flame-retardant resin composition having excellent electrical characteristics along with excellent mechanical properties including initial tensile strength and excellent heat aging resistance and flame retardancy.

Still another object of the present invention is to provide an insulated electrical wire employing either of the above flame-retardant resin compositions.

Other objects and effects of the present invention will be apparent from the following description.

In one aspect of the present invention, a flame-retardant resin composition is provided which has been obtained by irradiating with ionizing radiation a resin composition comprising 100 parts by weight of a thermoplastic resin, from 100 to 250 parts by weight of magnesium hydroxide, and from 1 to 10 parts by weight of an organosilicon compound and represented by formula (I):

wherein R represents an alkyl group containing a methacrylic or acrylic group and $Y^1$, $Y^2$, and $Y^3$ each represents a group selected from the group consisting of an alkyl group, an alkoxyl group, and a halogen group.

In another aspect of the present invention, an insulated electrical wire is provided which is obtained by coating the above flame-retardant resin composition on a conductor followed by irradiation.

Preferably, the resin composition of the present invention further comprises from 5 to 50 parts by weight of clay per 100 parts by weight of the thermoplastic resin.

DETAILED DESCRIPTION OF THE INVENTION

Examples of the thermoplastic resin employed in the present invention include polyethylene, ethylene-α-olefin copolymers, ethylene-propylene thermoplastic elastomers, ethylene-vinylacetate copolymers, ethylene-ethylacrylate copolymers, ethylene-methylmethacrylate copolymers, ethylene-methacrylic acid copolymers, ethylene-methylacrylate copolymers and the like. These may be used alone or as a mixture of two or more thereof. Among these, ethylene-vinylacetate copolymers having a melt index of from 0.5 to 5 and a vinylacetate content of from 28 to 45% by weight and ethylene-ethylacrylate copolymers having a melt index of from 0.5 to 5 and a ethylacrylate content of from 9 to 25% by weight are preferably used.

Examples of the organosilicon compound represented by formula (I) include γ-methacryloxypropyltrimethoxysilane, γ-methacryloxypropyltriethoxysilane, γ-acryloxypropyltrimethoxysilane, γ-methacryloxypropyldimethoxymethylsilane, γ-methacryloxypropyldimethylchlorosilane and the like. Among these, γ-methacryloxypropyltrimethoxysilane and γ-methacryloxypropyldimethoxymethylsilane are preferably used.

In the present invention, the incorporated amount of the organosilicon compound represented by formula (I) is from 1 to 10 parts by weight, preferably from 2 to 5 parts by weight, per 100 parts by weight of the thermoplastic resin. If the incorporated amount of the organosilicon compound is below 1 part by weight, it is difficult to obtain the effect of improving initial tensile strength and, in particular, to attain 1.06 kg/mm$^2$ or more which is the initial tensile strength value for polyolefin resin-insulated electrical wires as prescribed by the UL Standards. If the amount thereof exceeds 10 parts by weight, flame retardancy is adversely affected.

The exposure dose of ionizing radiation in the present invention is preferably in the range of from 3 to 50 Mrad, and more preferably from 5 to 25 Mrad. If the dose is below 3 Mrad, the improvement of the initial tensile strength tends to be insufficient. If the dose is above 50 Mrad, the initial tensile strength tends to be impaired.

Examples of the ionizing radiation include electron beams, γ-rays, X-rays, α-rays, etc., and electron beams are preferably used.

Various additives may be added to the resin composition of the present invention. Examples thereof include conventionally employed ones such as heat stabilizers, ultraviolet absorbers, lubricants, antioxidants, colorants, foaming agents, processing stabilizers, various kinds of organic or inorganic fillers, and the like.

In preparing the resin composition of the present invention, conventional mixing devices, such as a single-screw extruder, multi-screw extruder, Banbury mixer, rolls, kneader, high-speed fluid mixer of the heatable Henschel mixer type or the like, may be used. Using such a mixing device, the essential ingredients may be melt-kneaded together with other various ingredients, if necessary, at a temperature not lower than the melting point of the thermoplastic resin, thereby to prepare the resin composition.

The flame-retardant resin composition of the present invention can be advantageously used in applications such as insulated electrical wires (including cables) and insulating tubings, because the composition itself has excellent flame retardancy and heat aging resistance and also has a high initial tensile strength and excellent electrical characteristics. The composition is also useful for producing various molded parts and the like for use in fields where a high degree of flame retardancy is required.

In the case where an insulated electrical wire, in particular, is produced by using the above-described composition of the present invention, a coating layer composed of the resin composition is formed on a core conductor wire by extrusion coating or other means and then irradiated with ionizing radiation such as electron beams to produce an insulated electrical wire.

In the case where an insulating tubing, particularly a heat-shrinkable insulating tubing, is produced, the above-described composition is shaped into a tubing, which is then irradiated with ionizing radiation such as electron beams. The irradiated tubing is expanded in the direction of the diameter by applying an inner pressure or other means, while the tubing is kept being heated at a temperature not lower than the softening point thereof. The resulting tubing is then cooled to fix the expanded form, thereby to produce the desired tubing.

It has conventionally been known that in resin compositions obtained by incorporating inorganic fillers, reinforcements, and flame retardants into thermoplastic resins, the affinity of the resins for these additives can be improved by use of a coupling agent of the silane, titanium or aluminum type or other types, because such a coupling agent strongly affects the interfaces between the organic and inorganic materials (as described, e.g., in *Handbook Gomu-Plastic Haioo Yakuhin* (Handbook of Chemical Ingredients for Rubbers and Plastics), edited by Rubber Digest Co., Japan, latest edition, p. 442).

There have been many known coupling agents, especially silane coupling agents. Examples thereof include chlorosilanes such as γ-chloropropyltrimethoxysilane, γ-chloropropylmethyldichlorosilane, γ-chloropropyldiethoxysilane and the like and vinylsilanes such as vinyltriethoxysilane, vinyltrimethoxysilane and the like. These coupling agents have been widely used in reinforced plastics and others.

Also having been known are fillers, reinforcements, flame retardants and the like that have been surface-treated beforehand with a coupling agent so as to heighten the affinity thereof for resins. As a reverse of the above technique, a silane-grafted resin obtained by grafting a vinylsilane to a resin to thereby heighten the affinity of the resin for inorganic fillers has been also known.

For example, in the case where 180 parts by weight of magnesium hydroxide is to be mixed with 100 parts by weight of a thermoplastic resin such as an ethylene-vinylacetate copolymer to prepare a resin composition, a magnesium hydroxide surface-treated with a vinylsilane-type coupling agent can be advantageously used as the magnesium hydroxide filler because it attains better dispersibility during mixing than untreated magnesium hydroxide.

However, even the resin composition employing such a surface-treated magnesium hydroxide has been insufficient in initial tensile strength. Illustratively stated, each of the resin composition, material (A), in which the silane-treated magnesium hydroxide has been incorporated and the resin composition, material (B), in which untreated magnesium hydroxide has been incorporated was formed into a sheet with a thickness of 2.0 mm and subjected to a tensile test, and as a result, the initial tensile strength at break of material (B) containing untreated magnesium hydroxide was from 0.5 to 0.6 kg/mm$^2$ and that of material (A) containing silane-treated magnesium hydroxide was about 0.7 kg/mm$^2$. Thus, use of either of the two kinds of magnesium hydroxides failed to give a resin composition having an initial tensile strength higher, for example, than 1.06 kg/mm$^2$ which is the initial tensile strength value prescribed by the UL Standards for insulated electrical wires as described above.

Since the organosilicon compound of formula (I) employed in the present invention has a chemical structure similar to the above-described silane coupling agents, it can be expected that the organosilicon compound has the effect of improving the affinity of a resin for inorganic fillers.

Accordingly, material (C) obtained by kneading 100 parts by weight of a thermoplastic resin such as an ethylene-vinylacetate copolymer with 180 parts by weight of surface-untreated magnesium hydroxide and 3 parts by weight of γ-methacryloxypropyltrimethoxysilane as a compound of formula (I) was shaped likewise into a sheet and subjected to measurement of initial tensile strength at break, but the tensile strength was from 0.7 to 0.8 kg/mm$^2$. Thus, in this case also, a resin composition having an initial tensile strength above 1.06 kg/mm$^2$ could not be obtained.

However, it has been found that the initial tensile strength at break of the above material (C) can be heightened to the range of from 1.1 to 1.3 kg/mm$^2$ by irradiating the sheet-form material (C) with ionizing radiation such as electron beams to thereby crosslink the material to a gel fraction of 85% (extractant: xylene).

In the case of materials (A) and (B) described above, their initial tensile strengths at break cannot be heightened to values above 1.06 kg/mm$^2$ even by irradiation with electron beams. Even in the case where magnesium hydroxide that has been surface-treated beforehand with γ-methacryloxypropyltrimethoxysilane, a vinylsilane or a fatty acid such as stearic acid is used, the initial tensile strength at break of the material is from 0.7 to 0.8 kg/mm$^2$ in either case, and this tensile strength can hardly be improved even by irradiation with ionizing radiation such as electron beams.

However, in the case of a material obtained by a kneading method in which γ-methacryloxypropyltrimethoxysilane is added when a thermoplastic resin and surface-untreated magnesium hydroxide are mixed, as in the present invention, its initial tensile strength at break has been found to be heightened to a value above 1.06 kg/mm$^2$ by irradiating the material with ionizing radiation such as electron beams after shaping of the material.

As described above, surface-untreated magnesium hydroxide is preferably used in the present invention. However, surface-treated magnesium hydroxide may be used in combination with surface untreated magnesium hydroxide. In the case where surface-treated magnesium hydroxide is used in combination, the amount of the surface-treated magnesium hydroxide is preferably less than 50 parts by weight, more preferably less than 30 parts by weight, per 100 parts by weight of surface-untreated magnesium hydroxide. The total amount of magnesium hydroxide in the resin composition is from 100 to 250 parts by weight per 100 parts by weight of the thermoplastic resin.

The particle diameter of surface-untreated magnesium hydroxide used in the present invention is preferably in the range of from 0.1 to 3 μm.

In the production process of the resin composition of the present invention, it is not preferred to conduct surface-treatment of magnesium hydroxide with an organosilicon compound of formula (I). The resin composition of the present invention can be prepared, for example, by the following methods (1) to (3). (1) The thermoplastic resin is first melted in a mixing device, and the surface-untreated magnesium hydroxide is added and dispersed uniformly. The organosilicon compound represented by formula (I) is then added and mixed uniformly with the mixture. (2) The thermoplastic resin is first melted in a mixing device, and the magnesium hydroxide and the organosilicon compound are simultaneously added and mixed uniformly. (3) The thermoplastic resin is first melted in a mixing device, and the organosilicon compound is added and mixed uniformly. The magnesium hydroxide is then added and dispersed uniformly in the mixture. In these methods, mixing is preferably carried out at 100° to 140° C. for 3 to 10 minutes when an open roll mixer is used for example. The methods (1) and (2) are preferred in view of ease of handling.

The amount of the silicon compound of formula (I) to be incorporated in the resin composition comprising a thermoplastic resin and magnesium hydroxide is 1 part by weight or more per 100 parts by weight of the thermoplastic resin in order to improve initial tensile strength at break. Preferably, the amount thereof may be in the range of from 1 to 10 parts by weight from the standpoint of attaining the 1.06 kg/mm$^2$ value for polyolefin resin-insulated electrical wires as prescribed by the UL Standards. If the silicon compound amount exceeds 10 parts by weight, flame retardancy is adversely affected.

On the other hand, aluminum hydroxide also is known as another flame retardant not containing a halogen and is being extensively used practically. For example, a resin composition comprising an ethylene-vinylacetate copolymer resin and aluminum hydroxide incorporated therein is also known as a flame-retardant material that does not generate harmful gases during combustion. In this system also, aluminum hydroxide should be incorporated generally in an amount of from 100 to 250 parts by weight per 100 parts by weight of the thermoplastic resin in order to obtain an insulated electrical wire which stands, for example, the vertical flame test in the UL Standards (VW-1 Test; a test in which when a vertically held electrical wire is fired by applying a gas burner flame to the lower part of the wire, the fire should go out within 60 seconds, absorbent cotton spread under the electrical wire should not catch fire due to dropping of the burning or burned material, and a kraft paper flag placed at the top of the electrical wire should not catch fire due to the fire of the electrical wire). Like the compositions containing magnesium hydroxide, such a resin composition containing aluminum hydroxide in a large amount loading has the problem of significantly lowered initial tensile strength at break.

In the above-described resin composition containing aluminum hydroxide, its initial tensile strength at break could not be improved even by, for example, irradiation with ionizing radiation. Also in the case of a material obtained by a kneading method in which an organosilicon compound represented by formula (I) is added during the mixing of a thermoplastic resin and aluminum hydroxide, its initial tensile strength at break could not be improved at all even by irradiation with ionizing radiation.

Further, in the case of a material obtained by incorporating a vinylsilane such as vinyltriethoxysilane in place of the silicon compound of formula (I) during mixing of a thermoplastic resin and magnesium hydroxide, irradiation with ionizing radiation such as electron beams failed to heighten the initial tensile strength at break of the material to a value above 1.06 kg/mm$^2$.

Monomers having two or more unsaturated bonds per molecule, such as trimethylolpropane trimethacrylate, pentaerythritol triacrylate, ethylene glycol dimethacrylate, triallyl cyanurate, triallyl isocyanurate and the like, are often used for the purpose of heightening the efficiency of crosslinking of resinous components in ionizing radiation-irradiating processes. However, even in the case of such compositions, the initial tensile strengths at break of the compositions irradiated with ionizing radiation were still from 0.5 to 0.7 kg/mm$^2$, whether the fillers had been surface-treated or not and regardless of the kind of the surface-treating agent used.

The improvement in initial tensile strength at break of the above composition of the present invention may be attributable, for example, to coupling of the magnesium hydroxide with the ethylene-vinylacetate copolymer by the $\gamma$-methacryloxypropyltrimethoxysilane, crosslinking of the ethylene-vinylacetate copolymer by ionizing radiation, co-crosslinking (copolymerization) of the $\gamma$-methacryloxypropyltrimethoxysilane and the ethylene-vinylacetate copolymer and others. However, it should be said that the mechanism of the improvement in initial tensile strength at break has not yet been elucidated, in view of the fact that the effect of improving initial tensile strength at break is not produced in a composition comprising a mixture of the same thermoplastic resin with aluminum hydroxide and a silane compound of formula (I) and also in a composition in which a monomer containing two or more unsaturated bonds per molecule has been incorporated.

It can, therefore, be said that the initial tensile strength-improving effect characteristic of the present invention is brought about by irradiation with ionizing radiation in the case where the material to be irradiated is one that is obtained by mixing a thermoplastic resin and surface-untreated magnesium hydroxide and, during the mixing of the two ingredients, adding and incorporating an organosilicon compound of formula (I) thereinto.

Further, the above-described material obtained by mixing 100 parts by weight of an ethylene-vinylacetate copolymer resin with 180 parts by weight of surface-untreated magnesium hydroxide and, during the mixing of the two ingredients, incorporating thereinto 3 parts by weight of $\gamma$-methacryloxypropyltrimethoxysilane as a compound of formula (I) was found to be made highly flame-retardant. Illustratively stated, this material was shaped into a sheet having a thickness of 2.0 mm and then irradiated with 15 Mrad of electron beams at an acceleration voltage of 2 MeV and this test sample was subjected to a vertical flame test in accordance with the UL94 Standards, and as a result, its maximum burning time was 7 seconds, showing that the irradiated sample was highly flame-retardant to be in the rank of UL94V-0.

In the case where in place of irradiation with ionizing radiation, an organic peroxide and the like were incorporated into the above material and the resulting mixtures were kneaded and then vulcanized by heat treatment with application of pressure to obtain 2.0 mm-thick vulcanized sheets (gel fraction: 87%, extractant: xylene), the vulcanized materials showed initial tensile strengths of from 0.9 to 1.1 kg/mm$^2$. However, those having initial tensile strengths at break above 1.0 kg/mm$^2$ had initial elongations at break as low as below 80% and, further, it was found that many of those were not always highly flame-retardant because the resin compositions melt and fell in drops during burning when subjected to a vertical flame test in accordance with the UL94 Standards.

Thus, the sample obtained through irradiation with ionizing radiation such as electron beams and the sample obtained through heat-crosslinking by means of an organic peroxide have almost the same gel fraction amount but differ from each other in burning characteristics. Although the mechanism in which the above difference is caused has not been elucidated, it can be said that irradiation with ionizing radiation produces the desired effects in attaining both of heightened initial tensile strength at break and improved flame retardancy.

With respect to heat aging resistance, the above-described 2.0 mm-thick sample irradiated with electron beams showed good heat aging resistance with its residual elongation being from 85 to 95% after heat aging at 158° C. for 7 days that corresponds to the short-term aging conditions for the UL rating of 125° C. In contrast, materials obtained by kneading 100 parts by weight of an ethylene-vinylacetate copolymer with untreated magnesium hydroxide only or with magnesium hydroxide treated with a silane or a fatty acid had residual elongations below 65%.

With respect to volume resistivity, the material obtained by incorporating 180 parts by weight of magnesium hydroxide into 100 parts by weight of a thermoplastic resin such as an ethylene-vinylacetate copolymer, for example, has a volume resistivity on the $10^{13}$ $\Omega$cm level and, hence, does not satisfy, for example, the volume resistivity value of $10^{14}$ $\Omega$cm or more for polyolefin-based heat-shrinkable tubings as prescribed by the UL Standards. However, this insufficient volume resistivity can be heightened to $10^{14}$ $\Omega$cm or more by further incorporating clay into the material.

Even if the composition of the present invention does not contain clay, the effects of the invention are not impaired, except that improvement in volume resistivity is not attained.

The present invention will be explained below in more detail with reference to the following examples, which should not be construed to be limiting the scope of the invention.

EXAMPLES 1 TO 7 AND COMPARATIVE EXAMPLES 1 TO 23

Compositions were prepared by mixing ingredients according to the formulations as shown in Tables 1 to 5. Each of the thus-obtained compositions was extrusion-coated on a conductor (soft copper wire having a diameter of 0.8 mm) at a thickness of 0.40 mm, and the coated conductor was irradiated with electron beams at an acceleration voltage of 1 MeV to prepare a sample. In the preparation of each composition, the thermoplastic resin, filler, organosilicon compound, antioxidant, and other ingredients were mixed and kneaded at a time using 8-inch open roll mixer heated at 120° C.

The extrusion-coated materials were examined for initial tensile strength at break, initial elongation at break, volume resistivity, flame retardancy (vertical flame test: VW-1 Test, number of specimen: 5), and residual elongation (after 7-day heat aging at 158° C. in Geer oven). The term "residual elongation" used herein means percent retention of elongation at break and is calculated from the following equation:

$$\text{Residual elongation} = \frac{\text{Elongation at break after heat aging}}{\text{Initial elongation at break}} \times 100$$

TABLE 1

| | Example | | | | | | |
|---|---|---|---|---|---|---|---|
| | 1 | 2 | 3 | 4 | 5 | 6 | 7 |
| EVA (VA: 33%)[1] | 100 | 100 | — | — | 100 | — | — |
| EVA (VA: 28%)[2] | — | — | 100 | — | — | 100 | 100 |
| EEA (EA: 20%)[3] | — | — | — | 100 | — | — | — |
| Mg(OH)$_2$ | 180 | 180 | 180 | 180 | 180 | 200 | 180 |
| Clay | 30 | 30 | 20 | 20 | — | — | — |
| Basic magnesium carbonate | — | — | — | — | — | — | 20 |
| Tetrakis(methylene-3-(3,5-di-t-butyl-4-hydroxyphenyl)propionate)methane | 1 | 1 | 1 | 1 | 1 | 1 | 1 |
| γ-Methacryloxypropyltrimethoxysilane | 2 | 6 | 4 | 5 | 3 | 2 | 3 |
| Electron beam dose (Mrad) | 15 | 10 | 10 | 20 | 15 | 10 | 10 |
| Initial tensile strength at break (kg/mm$^2$) | 1.11 | 1.31 | 1.23 | 1.26 | 1.18 | 1.20 | 1.23 |
| Initial elongation at break (%) | 246 | 188 | 237 | 157 | 262 | 186 | 168 |
| Volume resistivity (Ωcm) | $4.7 \times 10^{14}$ | $6.1 \times 10^{14}$ | $5.7 \times 10^{14}$ | $5.1 \times 10^{14}$ | $3.3 \times 10^{13}$ | $5.7 \times 10^{13}$ | $5.2 \times 10^{13}$ |
| Residual elongation after 7-day aging at 158° C. (%) | 92 | 88 | 92 | 85 | 82 | 84 | 77 |
| Vertical flame test (VW-1) | passed | passed | passed | passed | passed | passed | passed |

TABLE 2

| | Comparative Example | | | | | | |
|---|---|---|---|---|---|---|---|
| | 1 | 2 | 3 | 4 | 5 | 6 | 7 |
| EVA (VA: 33%)[1] | 100 | 100 | 100 | 100 | 100 | 100 | — |
| EVA (VA: 28%)[2] | — | — | — | — | — | — | 100 |
| Mg(OH)$_2$ | 180 | 180 | — | — | — | — | 180 |
| Mg(OH)$_2$ (surface-treated with vinyl silane) | — | — | 180 | — | 180 | — | — |
| Mg(OH)$_2$ (surface-treated with stearic acid) | — | — | — | 180 | — | 180 | — |
| Clay | — | — | — | — | 30 | 30 | — |
| Tetrakis(methylene-3-(3,5-di-t-butyl-4-hydroxyphenyl)propionate)methane | 1 | 1 | 1 | 1 | 1 | 1 | 1 |
| γ-Methacryloxypropyltrimethoxysilane | — | — | 5 | 5 | 5 | 5 | 5 |
| Electron beam dose (Mrad) | 20 | 0 | 20 | 20 | 20 | 20 | 0 |
| Initial tensile strength at break (kg/mm$^2$) | 0.69 | 0.64 | 0.75 | 0.52 | 0.74 | 0.43 | 0.76 |
| Initial elongation at break (%) | 366 | 380 | 406 | 484 | 394 | 445 | 332 |
| Volume resistivity (Ωcm) | $3.8 \times 10^{13}$ | $4.6 \times 10^{13}$ | $7.1 \times 10^{13}$ | $4.8 \times 10^{13}$ | $5.1 \times 10^{14}$ | $7.1 \times 10^{14}$ | $6.6 \times 10^{13}$ |
| Residual elongation after 7-day aging at 158° C. (%) | 55 | 53 | 50 | 41 | 46 | 39 | 33 |
| Vertical flame test (VW-1) | passed | passed | passed | passed | passed | passed | passed |

TABLE 3

| | Comparative Example | | | | | | |
|---|---|---|---|---|---|---|---|
| | 8 | 9 | 10 | 11 | 12 | 13 | 14 |
| EVA (VA: 33%)[1] | — | — | — | 100 | 100 | — | — |
| EVA (VA: 28%)[2] | 100 | 100 | 100 | — | — | 100 | 100 |
| Mg(OH)$_2$ | — | — | 180 | 180 | 180 | 180 | — |
| Mg(OH)$_2$ (surface-treated with vinyl silane) | — | — | — | — | — | — | 180 |
| Mg(OH)$_2$ (surface-treated with stearic acid) | — | — | — | — | — | — | — |
| Al(OH)$_3$ | 180 | 180 | — | — | — | — | — |
| Tetrakis(methylene-3-(3,5-di-t-butyl-4-hydroxyphenyl)propionate)methane | 1 | 1 | 1 | 1 | 1 | 1 | 1 |
| γ-Methacryloxypropyltrimethoxysilane | — | 5 | — | — | — | — | — |
| Vinyltriethoxysilane | — | — | 5 | — | — | — | — |
| γ-Aminopropyltrimethoxysilane | — | — | — | 5 | — | — | — |
| γ-Glycidyltrimethoxysilane | — | — | — | — | 5 | — | — |
| Trimethylolpropane | — | — | — | — | — | 5 | 5 |

TABLE 3-continued

| | Comparative Example | | | | | | |
|---|---|---|---|---|---|---|---|
| | 8 | 9 | 10 | 11 | 12 | 13 | 14 |
| trimethacrylate | | | | | | | |
| Electron beam dose (Mrad) | 20 | 20 | 20 | 20 | 20 | 20 | 20 |
| Initial tensile strength at break (kg/mm$^2$) | 0.53 | 0.58 | 0.66 | 0.48 | 0.67 | 0.73 | 0.68 |
| Initial elongation at break (%) | 483 | 364 | 387 | 411 | 390 | 297 | 340 |
| Volume resistivity (Ωcm) | $1.3 \times 10^{13}$ | $8.9 \times 10^{12}$ | $5.2 \times 10^{13}$ | $5.7 \times 10^{13}$ | $3.2 \times 10^{13}$ | $2.8 \times 10^{13}$ | $4.3 \times 10^{13}$ |
| Residual elongation after 7-day aging at 158° C. (%) | 28 | 37 | 48 | 56 | 43 | 30 | 36 |
| Vertical flame test (VW-1) | passed | passed | passed | passed | passed | four not passed | three not passed |

TABLE 4

| | Comparative Example | | | |
|---|---|---|---|---|
| | 15 | 16 | 17 | 18 |
| EVA (VA: 33%)$^{(1)}$ | 100 | 100 | 100 | 100 |
| Mg(OH)$_2$ | 180 | 180 | — | — |
| Mg(OH)$_2$ (surface-treated with vinyl silane) | — | — | 180 | — |
| Mg(OH)$_2$ (surface-treated with stearic acid) | — | — | — | 180 |
| Clay | 30 | 30 | 30 | 30 |
| Tetrakis(methylene-3-(3,5-di-t-butyl-4-hydroxyphenyl)propionate)methane | 1 | 1 | 1 | 1 |
| γ-Methacryloxypropyl-trimethoxysilane | — | 3 | 5 | 5 |
| Electron beam dose (Mrad) | 15 | 0 | 15 | 15 |
| Initial tensile strength at break (kg/mm$^2$) | 0.68 | 0.72 | 0.74 | 0.43 |
| Initial elongation at break (%) | 348 | 373 | 394 | 445 |
| Volume resistivity (Ωcm) | $4.2 \times 10^{14}$ | $2.8 \times 10^{14}$ | $6.1 \times 10^{14}$ | $6.1 \times 10^{14}$ |
| Residual elongation after 7-day aging at 158° C. (%) | 43 | 38 | 46 | 39 |
| Vertical flame test (VW-1) | passed | passed | passed | passed |

TABLE 5

| | Comparative Example | | | | |
|---|---|---|---|---|---|
| | 19 | 20 | 21 | 22 | 23 |
| EVA (VA: 33%)$^{(1)}$ | 100 | — | — | 100 | 100 |
| EVA (VA: 28%)$^{(2)}$ | — | 100 | 100 | — | — |
| Mg(OH)$_2$ | 180 | 180 | 180 | 180 | 180 |
| Mg(OH)$_2$ (surface-treated with stearic acid) | — | — | — | — | — |
| Clay | 30 | 30 | 20 | 30 | 30 |
| Tetrakis(methylene-3-(3,5-di-t-butyl-4-hydroxyphenyl)propionate)methane | 1 | 1 | 1 | 1 | 1 |
| γ-Methacryloxypropyl-trimethoxysilane | 12 | 3 | — | — | 5 |
| Vnyltriethoxysilane | — | — | — | 5 | — |
| Dicumyl peroxide | — | — | — | — | 2 |
| Electron beam dose (Mrad) | 15 | 0 | 20 | 20 | 0$^{(4)}$ |
| Initial tensile strength at break (kg/mm$^2$) | 1.36 | 0.63 | 0.48 | 0.66 | 0.96 |
| Initial elongation at break (%) | 141 | 391 | 435 | 428 | 241 |
| Volume resistivity (Ωcm) | $3.7 \times 10^{14}$ | $5.2 \times 10^{14}$ | $4.1 \times 10^{14}$ | $3.2 \times 10^{14}$ | $1.7 \times 10^{14}$ |
| Residual elongation after 7-day aging at 158° C. (%) | 58 | 46 | 42 | 38 | 48 |

TABLE 5-continued

| | Comparative Example | | | | |
|---|---|---|---|---|---|
| | 19 | 20 | 21 | 22 | 23 |
| Vertical flame test (VW-1) | not passed | passed | passed | passed | not passed |

Note:
(1)Ethylene-vinylacetate copolymer
vinylacetate content: 33 wt %
melt index: 5 g/10 min (190° C., 2,160 g)
(2)Ethylene-vinylacetate copolymer
vinylacetate content: 28 wt %
melt index: 1 g/10 min (190° C., 2,160 g)
(3)Ethylene-ethylacrylate copolymer
ethylacrylate content: 20 wt %
melt index: 5 g/10 min (190° C., 2,160 g)
(4)20-minute heating in 180° C. silicone oil bath From the results summarized in the Tables, the following can be understood.

The resin compositions obtained in the Examples by mixing either an ethylene-vinylacetate copolymer or an ethylene-ethylacrylate copolymer with magnesium hydroxide and γ-methacryloxypropyltrimethoxysilane, followed by electron beam irradiation have initial tensile strengths above 1.06 kg/mm², stand the vertical flame test, and have residual elongations above 65% after 7-day aging at 158° C.

Of the resin compositions of the Examples, those containing clay have excellent volume resistivities on the $10^{14}$ Ωcm level, while those not containing clay have insufficient volume resistivities on the $10^{13}$ Ωcm level but are excellent in initial tensile strength and in residual elongation after heat aging.

By contrast, the resin compositions of Comparative Examples in which γ-methacryloxypropyltrimethoxysilane has not been incorporated have poor initial tensile strengths and residual elongations after heat aging, while the resin compositions of Comparative Examples in which γ-methacryloxypropyltrimethoxysilane has been incorporated but which have not undergone irradiation with electron beams also are poor in initial tensile strength and residual elongation after heat aging.

The resin compositions of Comparative Examples which employ magnesium hydroxide surface-treated with a silane or stearic acid have poor initial tensile strengths even when electron beam irradiation has been conducted. The resin composition of Comparative Example in which γ-methacryloxypropyltrimethoxysilane had been incorporated in an amount exceeding 10 parts by weight did not stand the flame test.

The resin compositions of Comparative Examples in which a vinylsilane had been incorporated showed poor initial tensile strengths even after irradiation with electron beams. The resin composition of Comparative Example that had been obtained by heat-vulcanizing a composition containing an organic peroxide was defective in that although its initial tensile strength had been improved, the strength was still below 1.06 kg/mm², that the composition failed to stand the flame test because the cotton spread under the electrical wire burned due to dropping of the burning or burned composition, and that the composition was also poor in heat aging resistance.

As described and demonstrated hereinabove, the flame-retardant resin composition of the present invention not only shows high flame retardancy with freedom from evolution of harmful gases, but also has good initial tensile strength, heat aging resistance, and volume resistivity. These effects characteristic in the present invention are brought about only when the composition comprises the specific ingredients in the proportions as specified hereinabove and, in addition, the composition has undergone irradiation with ionizing radiation such as electron beams. Because of these advantages, the flame-retardant resin composition of the present invention is exceedingly useful as a material for producing insulated electrical wires, insulating tubings, and the like for use in various kinds of electric or electronic machines and in house wiring.

While the invention has been described in detail and with reference to specific embodiments thereof, it will be apparent to one skilled in the art that various changes and modifications can be made therein without departing from the spirit and scope thereof.

What is claimed is:

1. A flame-retardant resin composition obtained by irradiating with ionizing radiation a resin composition comprising 100 parts by weight of a thermoplastic resin, from 100 to 250 parts by weight of magnesium hydroxide, and from 1 to 10 parts by weight of an organosilicon compound represented by formula (I):

wherein R represents an alkyl group containing a methacrylic or acrylic group and $Y^1$, $Y^2$, and $Y^3$ each represents a group selected from the group consisting of an alkyl group, an alkoxyl group, and a halogen group.

2. A flame-retardant resin composition as claimed in claim 1, wherein said resin composition to be irradiated with ionizing radiation further contains from 5 to 50 parts by weight of clay per 100 parts by weight of the thermoplastic resin.

3. A flame-retardant resin composition as claimed in claim 1, wherein the exposure dose of said ionizing radiation is from 3 to 50 Mrad.

4. A flame-retardant resin composition as claimed in claim 2, wherein the exposure dose of said ionizing radiation is from 3 to 50 Mrad.

5. A flame-retardant resin composition as claimed in claim 1, wherein said organosilicon compound represented by formula (I) is γ-methacryloxypropyltrimethoxysilane or γ-methacryloxypropyldimethoxymethylsilane.

6. A flame-retardant resin composition as claimed in claim 2, wherein said organosilicon compound represented by formula (I) is γ-methacryloxypropyltrimethoxysilane or γ-methacryloxypropyldimethoxymethylsilane.

7. A flame-retardant resin composition as claimed in claim 1, wherein the amount of said organosilicon compound is from 2 to 5 parts by weight.

8. A flame-retardant resin composition as claimed in claim 2, wherein the amount of said organosilicon compound is from 2 to 5 parts by weight.

9. An insulated electrical wire obtained by coating a resin composition on a conductor, said resin composition comprising 100 parts by weight of a thermoplastic resin, from 100 to 250 parts by weight of magnesium hydroxide, and from 1 to 10 parts by weight of an organosilicon compound represented by formula (I):

wherein R represents an alkyl group containing a methacrylic or acrylic group and $Y^1$, $Y^2$, and $Y^3$ each represents a group selected from the group consisting of an alkyl group, an alkoxyl group, and a halogen group, and then irradiating the resin composition coating with ionizing radiation.

10. An insulated electrical wire as claimed in claim 9, wherein said resin composition to be coated on the conductor wire further contains from 5 to 50 parts by weight of clay per 100 parts by weight of the thermoplastic resin.

11. An insulated electrical wire as claimed in claim 9, wherein the exposure dose of said ionizing radiation is from 3 to 50 Mrad.

12. An insulated electrical wire as claimed in claim 10, wherein the exposure dose of said ionizing radiation is from 3 to 50 Mrad.

13. An insulated electrical wire as claimed in claim 9, wherein said organosilicon compound represented by formula (I) is γ-methacryloxypropyltrimethoxysilane or γ-methacryloxypropyldimethoxymethylsilane.

14. An insulated electrical wire as claimed in claim 10, wherein said organosilicon compound represented by formula (I) is γ-methacryloxypropyltrimethoxysilane or γ-methacryloxypropyldimethoxymethylsilane.

15. An insulated electrical wire as claimed in claim 9, wherein the amount of said organosilicon compound is from 2 to 5 parts by weight.

16. An insulated electrical wire as claimed in claim 10, wherein the amount of said organosilicon compound is from 2 to 5 parts by weight.

* * * * *